(12) United States Patent
Chen

(10) Patent No.: US 7,945,794 B2
(45) Date of Patent: May 17, 2011

(54) PORTABLE COMPUTER WITH A POWER CONTROL FUNCTION

(75) Inventor: Chih-Pin Chen, Taipei (TW)

(73) Assignee: ASUSTeK Computer Inc., Peitou, Taipei (TW)

( * ) Notice: Subject to any disclaimer, the term of this patent is extended or adjusted under 35 U.S.C. 154(b) by 1141 days.

(21) Appl. No.: 11/594,789

(22) Filed: Nov. 9, 2006

(65) Prior Publication Data

US 2007/0150764 A1 Jun. 28, 2007

(30) Foreign Application Priority Data

Dec. 22, 2005 (TW) .............................. 94145787 A

(51) Int. Cl.
*G06F 1/00* (2006.01)
*G06F 1/26* (2006.01)
(52) U.S. Cl. ........................................ 713/320; 713/300
(58) Field of Classification Search .................. 713/300, 713/320
See application file for complete search history.

(56) References Cited

U.S. PATENT DOCUMENTS

| | | | | |
|---|---|---|---|---|
| 4,894,533 A | * | 1/1990 | Abe et al. .................. 250/231.13 |
| 5,015,056 A | * | 5/1991 | Yamaguchi et al. ............ 385/25 |
| 5,079,845 A | * | 1/1992 | Childers ...................... 33/363 K |
| 5,949,067 A | * | 9/1999 | Sano ......................... 250/231.13 |
| 6,184,518 B1 | * | 2/2001 | Klein ............................. 250/233 |
| 6,597,406 B2 | * | 7/2003 | Gloudemans et al. ......... 348/587 |
| 6,752,318 B2 | * | 6/2004 | Ishii ............................... 235/470 |
| 6,944,481 B2 | * | 9/2005 | Hama et al. ................... 455/566 |
| 6,972,403 B2 | * | 12/2005 | Martenson et al. ....... 250/231.13 |
| 7,370,983 B2 | * | 5/2008 | DeWind et al. ................ 359/844 |
| 7,405,392 B2 | * | 7/2008 | Musha et al. ............ 250/231.13 |
| 7,405,393 B2 | * | 7/2008 | Martenson et al. ....... 250/231.13 |
| 2002/0037754 A1 | * | 3/2002 | Hama et al. ................... 455/566 |
| 2002/0043563 A1 | * | 4/2002 | Ishii ........................... 235/462.01 |
| 2005/0207104 A1 | * | 9/2005 | Love ............................... 361/683 |
| 2006/0164230 A1 | * | 7/2006 | DeWind et al. ................ 340/461 |
| 2007/0149262 A1 | * | 6/2007 | Navntoft .................... 455/575.3 |

* cited by examiner

*Primary Examiner* — Thomas Lee
*Assistant Examiner* — Jaweed A Abbaszadeh
(74) *Attorney, Agent, or Firm* — Winston Hsu; Scott Margo

(57) ABSTRACT

A portable computer with a power control function is disclosed to include a first body, a hinge, a second body coupled to the first body through the hinge, an optical sensor having a transmitter and a receiver and mounted on the first body, an optical grating connected to the hinge and having a part located between the transmitter and the receiver, a control circuit, and an electronic component. When the second body is turned relative to the first body, the optical sensor generates a first sensing voltage and a second sensing voltage subject to the turning action of the optical grating so that the control circuit controls the power of the electronic component based on the first sensing voltage and the second sensing voltage provided by the optical sensor.

9 Claims, 5 Drawing Sheets

PORTABLE COMPUTER WITH A POWER CONTROL FUNCTION

BACKGROUND OF THE INVENTION

1. Field of the Invention

The present invention relates to a portable computer and, more particularly, to a portable computer with a power control function.

2. Description of Related Art

The management of the power supply of a notebook computer is quite important because notebook computer users are more and more critical on the characteristic of mobility. The power supply of a notebook computer includes two parts, namely, the system power supply for the main unit and the power supply for the LCD display.

In many circumstances, a notebook computer user needs only to use the main unit of the notebook computer without using the LCD display. For example, when making a brief presentation, the user may connect a projector to the notebook computer to display the content of the brief presentation by projection. At this time, the notebook computer operator needs not to use the LCD display of the notebook computer. However, the LCD display of the notebook computer may still in action, wasting much power supply.

Notebook computers with a cover switch or magnetic switch to control the power supply for the LCD display are commercially available. When the user needs not to use the LCD display, the user can close the LCD display of the notebook computer to drive the cover switch or magnetic switch, thereby turning off the power supply for the backlight module.

The aforesaid cover switch or magnetic switch has numerous drawbacks. The use of a cover switch in a notebook computer obstructs the sense of beauty of the notebook computer's outer appearance. Further, the mechanical cover switch may malfunction when by an external force deforms the LCD display of the notebook computer accidentally. If a magnetic switch is used in a notebook computer, it acts subject to a predetermined Gauss value between magnets. However, it is difficult to control the generation of the predetermined Gauss value between magnets, and the distance detected by the sensor of the magnetic switch may change. Further, the Gauss value may attenuate after a long use of the magnetic switch, resulting in a control error. In this case, the magnetic switch may switch off the power supply of the backlight module of the LCD display erroneously when the notebook computer is kept opened.

SUMMARY OF THE INVENTION

The present invention has been accomplished under the circumstances in view. It is one object of the present invention to provide a portable computer with a power control function, which saves the battery power supply of a notebook computer.

It is another object of the present invention to provide a portable computer with power control function, which accurately controls the LCD display power supply and system power supply of a notebook computer.

To achieve these and other objects of the present invention, the portable computer comprises a hinge, a first body, a second body, an optical sensor, an optical grating, a control circuit, and an electronic component. The hinge comprises a first part, and a second part pivotally coupled to the first part. The first body is affixed to the first part of the hinge. The second body is affixed to the second part of the hinge and rotatable with the second part of the hinge relative to the first body. The optical sensor is mounted on the first body, comprising transmitter means and receiver means. The transmitter means is adapted to emit a beam to the receiver means. The optical grating is connected to the second part of the hinge and rotatable with the second part of the hinge relative to the first part, comprising a plurality of openings and a plurality of blocking zones. Further, the optical grating has at least one part located between the transmitter means and the receiver means such that the optical sensor generates a first sensing voltage when one of the blocking zones blocks the beam from the receiver means. The optical sensor generates a second sensing voltage when the beam passes through one of the openings to the receiver means. The control circuit is electrically connected to the optical sensor and adapted to generate a plurality of control signals for controlling the operation of an electronic component being electrically connected to the control circuit subject to the first sensing voltage and second sensing voltage provided by the optical sensor.

The aforesaid first body and second body can be the main unit and LCD display of a notebook computer respectively. The control circuit generates a cumulated number value subject the first sensing voltage and second sensing voltage provided by the optical grating, and then generates one control signal subject to the cumulated number value. The cumulated number value is zeroed when the second body is closed on the first body. Further, the cumulated number value is directly proportional to the open angle of the first body relative to the second body.

The control signals provided by the aforesaid control circuit include a first control signal. The aforesaid portable computer further comprises a power supply module, which is controlled to output power supply to the portable computer when the control circuit generates the first control signal.

The aforesaid control signals further include a second control signal adapted to control the electronic component in a half-open status, and a third control signal adapted to control the electronic component in a full-open status.

The aforesaid electronic component is a backlight module mounted in the second body. The backlight module is on half brightness when the control circuit generates the second control signal, or on full brightness when the control circuit generates the third control signal.

The portable computer further comprises a power supply module. The control signals further include a fourth control signal adapted to control the power supply module to turn off power supply from the portable computer.

The portable computer further comprises a resistance unit, a plurality of sensing ends and a resistance sensor unit. The resistance unit is adhered to the second part of the hinge. The sensing ends and the resistance sensor unit are mounted on the first body. The resistance sensor unit is electrically connected to the control circuit and detects resistance values provided by the resistance unit. The resistance sensor unit transmits the variation of resistance value to the control circuit so that the control circuit controls power supply to the electronic component based on the variation of resistance value.

DETAILED DESCRIPTION OF THE PREFERRED EMBODIMENT

Figure 1:
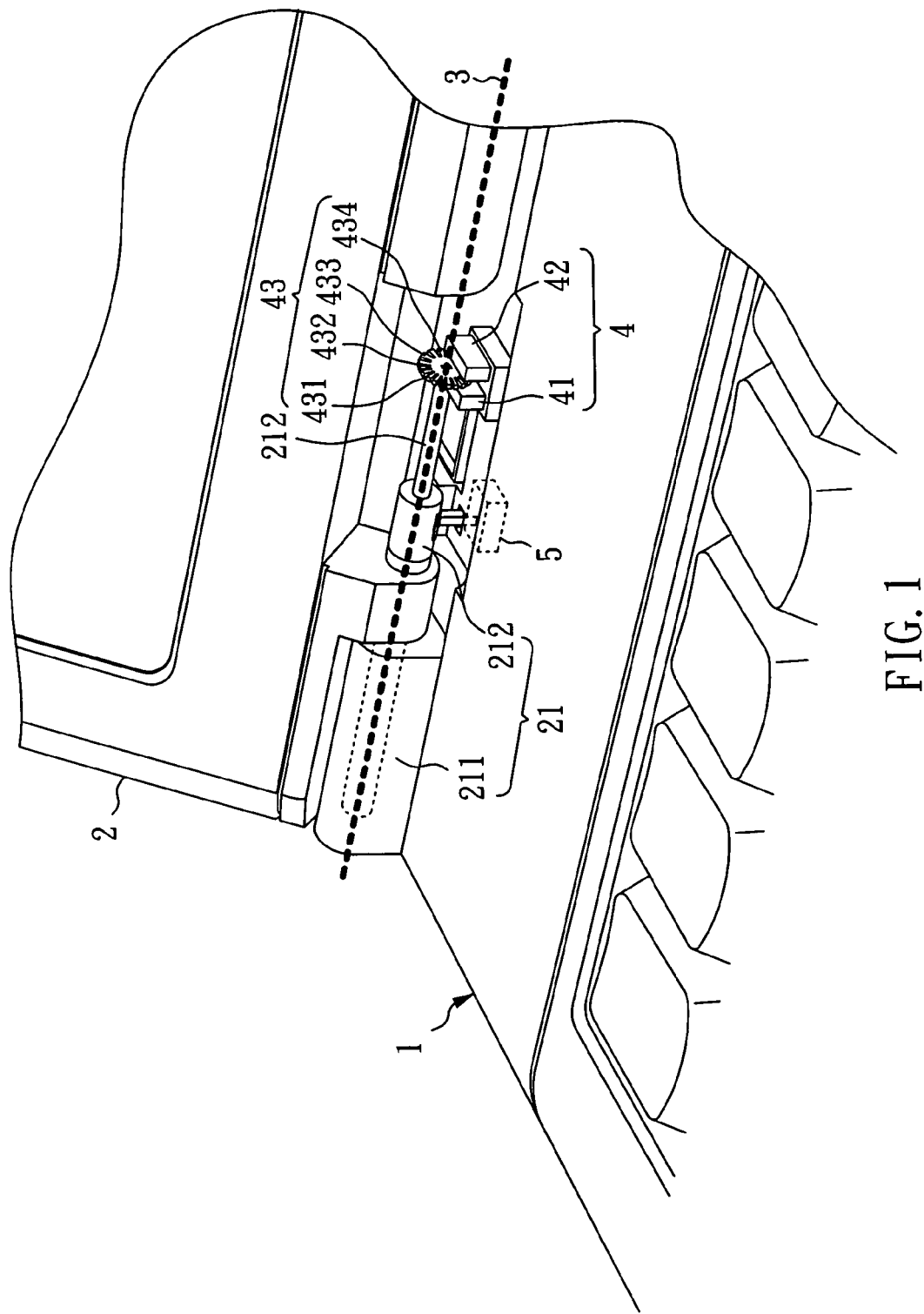
FIG. 1 is a schematic structural view of the preferred embodiment of the present invention.

Referring to FIG. 1, a portable computer with a power control function in accordance with the preferred embodiment of the present invention is shown comprising a first body 1, a second body 2, and a hinge 21. The hinge 21 has a first part 211 and a second part 212. The first part 211 and the second part 212 are pivotally coupled together. The first part 211 is affixed to the first body 1. The second part 212 is affixed to the second body 2 and pivoted to the first part 211. By means of the hinge 21, the first body 1 and the second body 2 are rotatable relative to each other. Further, there is an imaginary axis 3 between the first body 1 and the second body 2 about which the second body 2 is turned relative to the first body 1.

The portable computer according to the present preferred embodiment is a notebook computer. In other embodiments of the present invention, the portable computer may be any of a variety of portable computers having a display unit, for example, a smartphone or pocket computer. In this embodiment, the first body 1 is the main unit of the notebook computer, and the second body 2 is the LCD display of the notebook computer. In another embodiment of the present invention, the first body 1 and the second body 2 may be the LCD display and main unit of a notebook computer, respectively.

The aforesaid first body 1 has mounted thereon an optical sensor 4 including a transmitter 41 and a receiver 42. The transmitter 41 is adapted to transmit a beam to the receiver 42. The second part 212 of the aforesaid hinge 21 is connected to an optical grating 43 having a plurality of openings 431, 432 and a plurality of blocking zone 433, 434. In addition, the optical grating 43 has at least a part located between the transmitter 41 and the receiver 42.

Figure 2B:
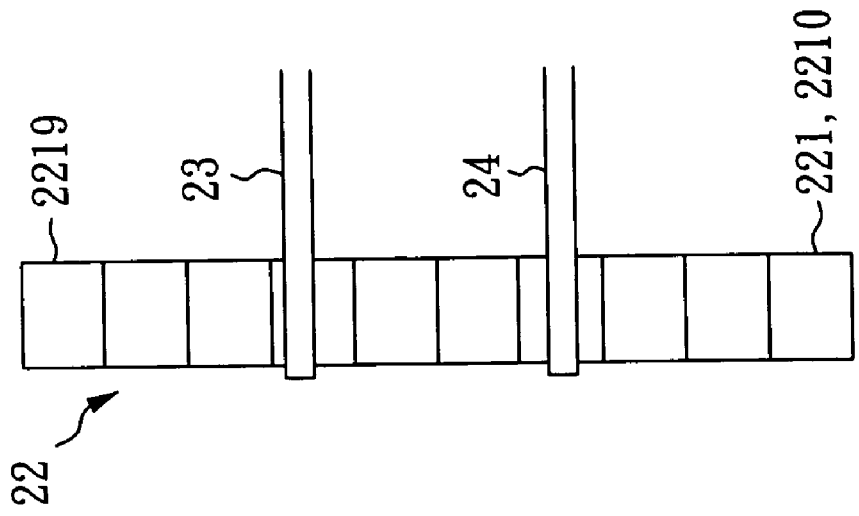
FIG. 2B is a schematic drawing showing the resistance unit according to the present invention.
Figure 2A:
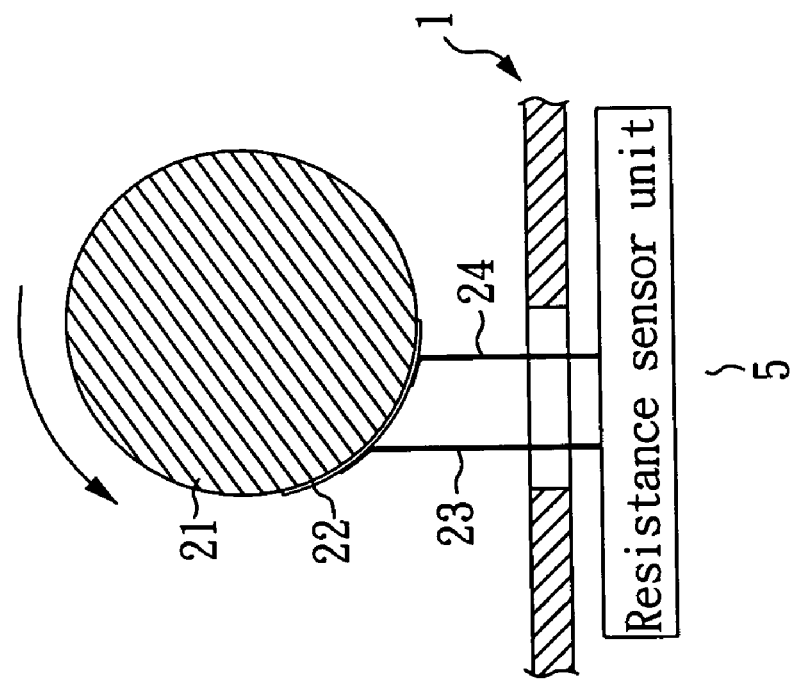
FIG. 2A is a schematic drawing showing the arrangement of the resistance unit and the resistance sensor unit according to the present invention.

As shown in FIG. 2A, a resistance sensor unit 5 is mounted on the first body 1, and a resistance unit 22 is adhered to the second part 212 of the hinge 21. The resistance sensor unit 5 touches the resistance unit 22 by means of sensing ends 23, 24. According to the present preferred embodiment as shown in FIG. 2B, the resistance unit 22 is a flexible printed circuit board having multiple segments 221. The segments 221 have different resistance values. For example, the resistance unit 22 includes 10 segments 221 wherein the resistance value of the first segment 2210 is the smallest, and the resistance value of the 10-th segment 2219 is the greatest. Alternatively, the resistance value 22 may be a flexible printed circuit board having a width gradually increased in one direction.

Figure 3:
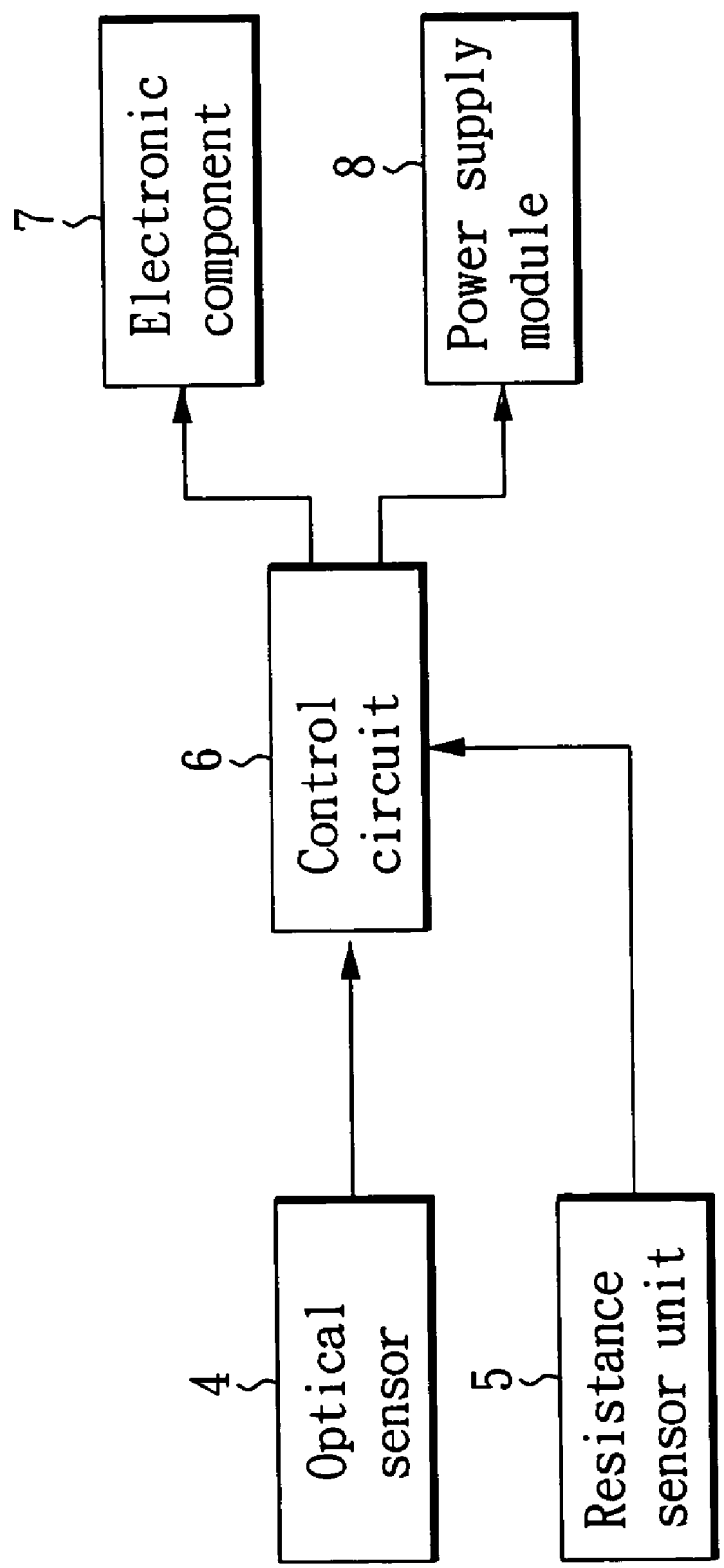
FIG. 3 is a functional block diagram of the preferred embodiment of the present invention.

FIG. 3 is a functional block diagram of the preferred embodiment of the present invention. In addition to the aforesaid optical sensor 4 and resistance sensor unit 5, the preferred embodiment of the invention further comprises a control circuit 6, an electronic component 7, and a power supply module 8. The optical sensor 4 and the resistance sensor unit 5 are respectively and electrically connected to the control circuit 6. The control circuit 6 is electrically connected to the electronic component 7 and the power supply module 8.

The purposes and operation of the component parts of the preferred embodiment of the present invention are described hereinafter with reference to FIGS. 1, 2A, 2B and 3 again. When the portable computer of the preferred embodiment of the present invention is in use, the second body 2 may be turned relative to the first body 1, i.e., the second body 2 is closed (on the first body 1) in the initial state, and the second body 2 is opened from the first body 1 when the portable computer is used.

Because the optical grating 43 is connected to the second part 212 of the hinge 21, the optical grating 43 is turned with the second part 212 of the hinge 21 when the second body 2 is turned relative to the first body 1. Therefore, the blocking zone 433, 434 will block the beam from the transmitter 41 of the optical sensor 4, causing the optical sensor 4 to generate a first sensing voltage (for example, low potential). Moreover, the beam from the transmitter 41 will also pass through the openings 431, 432 of the optical grating 43 to the receiver 42, causing the optical sensor 4 to generate a second sensing voltage (for example, high potential). Therefore, when the second body 2 is turned relative to the first body 1, the optical sensor 4 keeps generating a first sensing voltage and a second sensing voltage in proper order, and sends the generated first sensing voltage and second sensing voltage to the control circuit 6. These first sensing voltage and second sensing voltage form a number of pulse signals.

The aforesaid control circuit 6 receives the series of pulse signals each formed of a first sensing voltage and a second sensing voltage, and counts the number of the pulse signals received so as to obtain a cumulated number value, which is directly proportional to the open angle between the first body 1 and the second body 2. Thereafter, the control circuit 6 generates multiple control signals subject to the cumulated number value for controlling the electronic component 7 or outputting power supply from the power supply module 8.

In this embodiment, the electronic component 7 is a backlight module in the second body 2. Alternatively, the electronic component 7 may be a light emitting device module, for example, a LED module formed of a plurality of WLED (white light emitting diodes).

Figure 4:
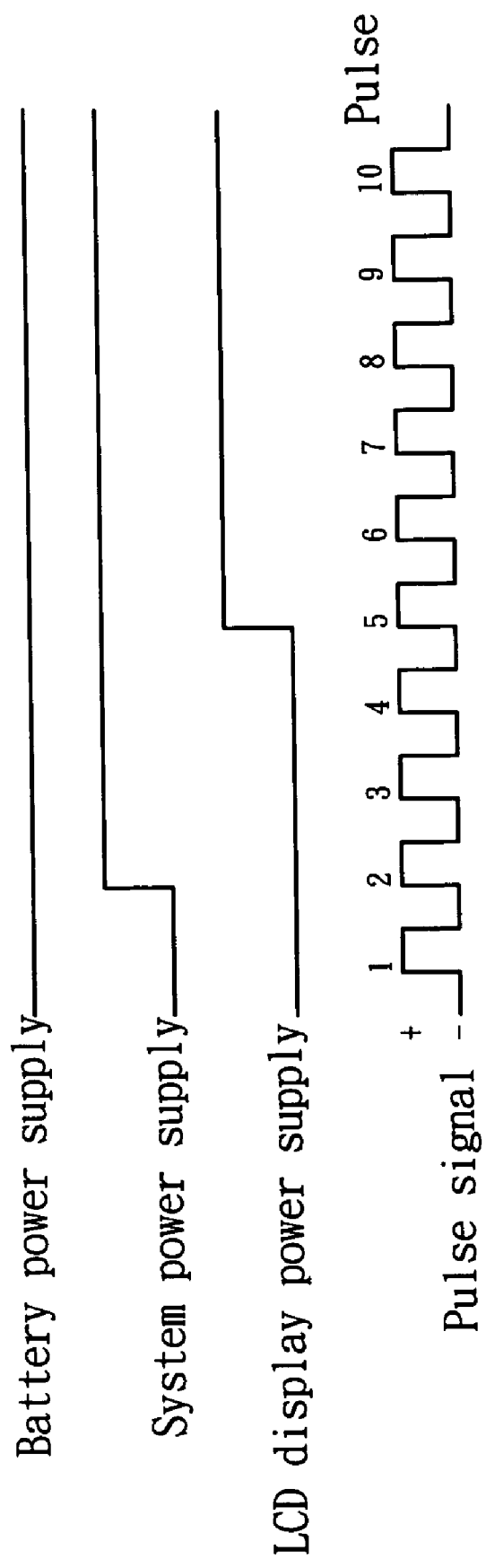
FIG. 4 is an operation timing diagram of the preferred embodiment of the present invention.
Figure 5:
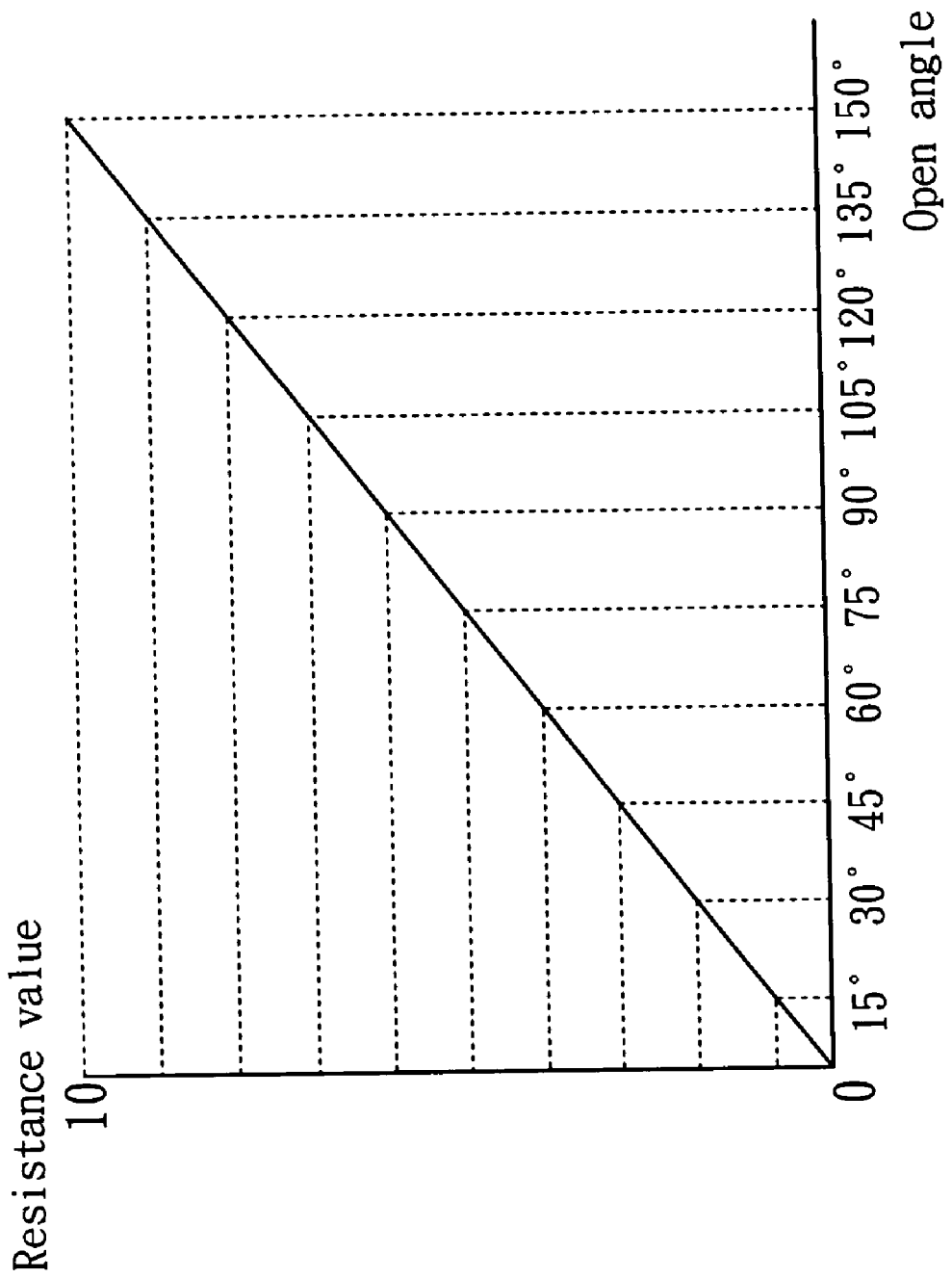
FIG. 5 is a resistance-vs-open angle chart according to the present invention.

FIG. 4 is an operation timing diagram of the preferred embodiment of the present invention, which shows the battery power supply, system power supply and LCD display power supply of the portable computer. Referring also to FIGS. 1-3, when the user opens the second body 2 from the first body 1, the optical sensor 4 provides a series of pulse signals each containing a first sensing voltage and a second sensing voltage to the control circuit 6. If the cumulated number value of the received series of pulse signals is 2 (the open angle between the first body 1 and the second body 2 is about 30 degrees at this time), the control circuit 6 generates a first control signal and sends this first control signal to the power supply module 8, so as to provide system power supply for system power-on operation.

When the user keeps turning the second body 2 and the cumulated number value of the received series of pulse signals reaches 4, the open angle between the first body 1 and the second body 2 is about 60 degrees. At this time, the control circuit 6 generates a second control signal for controlling the electronic component 7 (i.e. backlight module) to be on half brightness.

When the cumulated number value of the received series of pulse signals reaches 9, the open angle between the first body 1 and the second body 2 is about 135degrees (the normal angle of use). At this time, the control circuit 6 generates a third control signal and sends this third control signal to the electronic component 7, so as to control the electronic component 7 (i.e. backlight module) to be on full brightness.

In some circumstances, for example, during a meeting, the user may need only to maintain the system power supply of the portable computer without using the LCD display power supply. At this time, the user may turn the second body 2 relative to the first body 1 to change the open angle from the normal angle of use (135 degrees) to another angle (about 60 degrees).

When turning the second body 2 from the open angle of 135 degrees to the open angle of 60 degrees, the control circuit 6 will receive a series of pulse signals each formed of a first sensing voltage and a second sensing voltage. Therefore, the control circuit 6 must be able to detect the turning direction of the second body 2 so as to deduct the number of the received pulse signals from the cumulated number value. As shown in FIGS. 2A and 2B, the invention uses the resistance unit 22, the sensing ends 23, 24 and the resistance sensor unit 5 to support the control circuit 6 in judging the turning direction of the second body 2. The resistance sensor unit 5 detects the resistance value of the resistance unit 22 via the sensing ends 23, 24. Because the segments 221 of the resistance unit 22 have different resistance values ranging from the smallest toward the greatest, the resistance sensor unit 5 detects the variation of resistance value of different segments 221 of the resistance unit 22 and sends the detection result to the control circuit 6, enabling the control circuit 6 to judge the direction of rotation of the second body 2. For example, when the resistance value changes from a relatively greater value to a relatively smaller value, the control circuit 6 is aware of the second body 2 being turned toward the close position.

As shown in FIGS. 1-3, during turning action of the second body 2 from the open angle of 135 degrees to the open angle of 60 degrees, the control circuit 6 receives a series of pulse signals each formed of a first sensing voltage and a second sensing voltage, detects a change of resistance value from a relatively greater value to a relatively smaller value, and deducts the number of the received pulse signals from the cumulated number value, making the cumulated number value to become, for example, 4. Therefore, the control circuit 6 generates a second signal and sends the generated second signal to the electronic component 7 (i.e. backlight module), the electronic component 7 (i.e. backlight module) is thus on half brightness to save the battery power supply of the portable computer.

The user may open the second body 2 to the normal angle of use (135 degrees) again after having slightly closed the second body 2. At this time, the cumulated number value counted by the control circuit 6 is increased to 9; therefore the control circuit 6 controls the electronic component 7 (i.e. backlight module) to be on full brightness.

Further, when the second body 2 is closed on the first body 1, the cumulated number value is reset to zero, causing the control circuit 6 to generate a fourth control signal and to send this fourth control signal to the power supply module 8 to turn off the system power supply.

In another embodiment of the present invention, the control circuit 6 generates a corresponding control signal within a cumulated number range. For example, the control circuit 6 generates a first control signal to start the system power supply when the cumulated number value is at 1-2; the control circuit 6 generates a second control signal to control the electronic component 7 (i.e. backlight module) on half brightness when the cumulated number value is at 4-6. Other similar measurement may be employed to have the control circuit 6 control the power supply status of the electronic component 7 (i.e. backlight module) subject to a predetermined pulse signal counting step.

In view of the foregoing, it is known that the embodiment of the invention uses an optical sensor to detect the relative rotary motion between the first body and the second body and to generate pulse signals each formed of a first sensing voltage and a second sensing voltage for enabling a control circuit to control the operation of an electronic component, such as a backlight module, and the supply of power of a power supply module subject to the cumulated number value of the pulse signals counted, thereby saving much the power consumption of the notebook computer.

Although the present invention has been explained in relation to its preferred embodiment, it is to be understood that many other possible modifications and variations can be made without departing from the spirit and scope of the invention as hereinafter claimed.

What is claimed is:

1. A portable computer with a power control function comprising:
   a hinge having a first part and a second part pivotally coupled to the first part;
   a first body affixed to the first part of the hinge;
   a second body affixed to the second part of the hinge and rotatable with the second part of the hinge relative to the first body;
   an optical sensor mounted on the first body, the optical sensor having transmitter means and receiver means, the transmitter means being adapted to emit a beam to the receiver means;
   an optical grating connected to the second part of the hinge and rotatable with the second part of the hinge relative to the first part, the optical grating having a plurality of openings and a plurality of blocking zones, the optical grating having at least one part located between the transmitter means and the receiver means such that the optical sensor generates a first sensing voltage when one of the blocking zones blocks the beam from the receiver means, the optical sensor generating a second sensing voltage when the beam passes through one of the openings to the receiver means;
   a backlight module mounted in the second body; and
   a control circuit electrically connected to the optical sensor and the backlight module;
   wherein when the second body is rotated to a second open angle with respect to the first body, the control circuit generates a second control signal for controlling the backlight module to be on half brightness according to the first and second sensing voltages; when the second body is rotated to a third open angle with respect to the first body, the control circuit generates a third control signal for controlling the backlight module to be on full brightness according to the first and second sensing voltages.

2. The portable computer as claimed in claim 1, further comprising a power supply module electrically connected to the control circuit, wherein when the second body is rotated to a first open angle with respect to the first body, the control circuit generates a first control signal for controlling the power supply module to output power supply to the portable computer according to the first and second sensing voltages.

3. The portable computer as claimed in claim 2, wherein when the second body is closed on the first body, the control circuit generates a fourth control signal for controlling the power supply module to cut off power supply from the portable computer.

4. The portable computer as claimed in claim 1, wherein the first body is a main unit of a notebook computer and the second body is a LCD display of the notebook computer.

5. The portable computer as claimed in claim 1, further comprising a resistance unit, a plurality of sensing ends and a resistance sensor unit, the resistance unit being adhered to the second part of the hinge, the sensing ends and the resistance sensor unit being mounted on the first body.

6. The portable computer as claimed in claim 5, wherein the resistance sensor unit is electrically connected to the control circuit and detects resistance values provided by the resistance unit to obtain a variation of resistance value; the resistance sensor unit transmits the variation of resistance value to the control circuit so that the control circuit controls power supply to the backlight module based on the variation of resistance value.

7. The portable computer as claimed in claim 3, wherein the control circuit generates a cumulated number value subject to the first and second sensing voltages generated by the optical sensor, and then generates one of the first, second, third and fourth control signals subject to the cumulated number value.

8. The portable computer as claimed in claim 7, wherein the cumulated number value is reset to zero when the second body is closed on the first body.

9. The portable computer as claimed in claim 7, wherein the cumulated number value is directly proportional to an open angle between the first body and the second body.

* * * * *